(12) United States Patent
Matsumoto

(10) Patent No.: US 8,504,230 B2
(45) Date of Patent: Aug. 6, 2013

(54) CONTROL APPARATUS FOR AC ELECTRIC MOTOR VEHICLE

(75) Inventor: Takeo Matsumoto, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 47 days.

(21) Appl. No.: 13/144,723

(22) PCT Filed: Mar. 25, 2009

(86) PCT No.: PCT/JP2009/055954
§ 371 (c)(1),
(2), (4) Date: Jul. 15, 2011

(87) PCT Pub. No.: WO2010/109607
PCT Pub. Date: Sep. 30, 2010

(65) Prior Publication Data
US 2011/0276214 A1 Nov. 10, 2011

(51) Int. Cl.
*B60L 9/00* (2006.01)

(52) U.S. Cl.
USPC .................... 701/22; 318/107; 318/400.3

(58) Field of Classification Search
USPC .................. 701/22; 318/107, 400.3, 441
See application file for complete search history.

(56) References Cited

U.S. PATENT DOCUMENTS

| | | | |
|---|---|---|---|
| 4,296,367 A * | 10/1981 | Hirata | 318/808 |
| 4,431,956 A * | 2/1984 | Angquist | 318/759 |
| 4,491,768 A * | 1/1985 | Slicker | 318/139 |
| 4,843,296 A | 6/1989 | Tanaka | |
| 4,978,894 A * | 12/1990 | Takahara | 318/768 |
| 5,629,592 A * | 5/1997 | Henmi | 318/107 |
| 5,642,020 A | 6/1997 | Miyazaki | |
| 6,307,759 B1 | 10/2001 | Inarida et al. | |
| 6,437,997 B1 | 8/2002 | Inarida et al. | |
| 8,258,735 B2 * | 9/2012 | Kitanaka | 318/400.3 |
| 2004/0231897 A1 | 11/2004 | Kimura et al. | |
| 2006/0005739 A1 | 1/2006 | Kumar | |
| 2010/0078993 A1 | 4/2010 | Ichikawa | |
| 2011/0175558 A1* | 7/2011 | Kitanaka | 318/400.3 |
| 2012/0081058 A1* | 4/2012 | Bortolus et al. | 318/490 |

FOREIGN PATENT DOCUMENTS

| | | |
|---|---|---|
| CN | 1265784 A | 9/2000 |
| EP | 0115857 A1 | 8/1984 |
| JP | 57-059401 A | 4/1982 |

(Continued)

OTHER PUBLICATIONS

Office Action (Notice of Rejection) dated Jan. 19, 2010, issued in the corresponding Japanese Patent Application No. 2009-531689, and an English Translation thereof.

(Continued)

*Primary Examiner* — Helal A Algahaim
(74) *Attorney, Agent, or Firm* — Buchanan Ingersoll & Rooney PC

(57) ABSTRACT

A control apparatus for an AC electric motor vehicle including a converter that converts an AC voltage input from an AC overhead wire via a transformer into a DC voltage, an inverter that converts the DC voltage into an AC voltage, and a motor that is driven and controlled by the inverter includes: torque-command calculating units that calculate a torque command value of the motor and output the torque command value to the inverter; and a static inverter that supplies electric power to a load mounted on the AC electric motor vehicle.

3 Claims, 2 Drawing Sheets

(56) References Cited

FOREIGN PATENT DOCUMENTS

| JP | 60-200790 | A | 10/1985 |
|---|---|---|---|
| JP | 2-219401 | A | 9/1990 |
| JP | 07-123501 | | 5/1995 |
| JP | 2003-199354 | A | 7/2003 |
| RU | 39306 | U1 | 7/2004 |
| WO | 2009011269 | A1 | 1/2009 |

OTHER PUBLICATIONS

International Search Report (PCT/ISA/210) issued on Jun. 16, 2009, by Japanese Patent Office as the International Searching Authority for International Application No. PCT/JP2009/055954.

Written Opinion (PCT/ISA/237) issued on Jun. 16, 2009, by Japanese Patent Office as the International Searching Authority for International Application No. PCT/JP2009/055954.

Decision on Grant from Russian Patent Office dated Oct. 30, 2012, issued in corresponding Russian Patent Application No. 2011142903/11, with English translation thereof.

Office Action from Canadian Intellectual Property Office dated Feb. 25, 2013, issued in corresponding Canadian Patent Application No. 2,756,408.

Extended Search Report from European Patent Office dated Apr. 12, 2013, issued in corresponding European Application No. 09842221.5.

Office Action from Chinese Patent Office dated Apr. 1, 2013, issued in corresponding Chinese Patent Application No. 200980158281.0, with an English translation thereof. (10 pages).

* cited by examiner

CONTROL APPARATUS FOR AC ELECTRIC MOTOR VEHICLE

TECHNICAL FIELD

The present invention relates to a control apparatus for an AC electric motor vehicle, and, more particularly to a control apparatus for an AC electric motor vehicle that causes, with a simple configuration, a static inverter as an auxiliary power supply (hereinafter simply referred to as "SIV"), which supplies electric power to a vehicle even during a loss of overhead power such as pantograph bounce or section passage, to continuously operate.

BACKGROUND ART

As the configuration of a control apparatus for an AC electric motor vehicle in the past, an SIV is connected to an intermediate DC link circuit of a main conversion device, that is, a converter-inverter (hereinafter simply referred to as "CI"), which is a propulsion controller. In the control apparatus for the AC electric motor vehicle, this configuration makes it possible to use an AC-DC converter for the SIV and an AC-DC converter of the CI in common and makes it unnecessary to provide tertiary winding of a main transformer. Therefore, it is possible to realize a reduction in size and weight of an electric component as a whole.

On the other hand, when the AC electric motor vehicle loses overhead power because of pantograph bounce, section passage, or the like, usually, the control apparatus for the AC electric motor vehicle stops the operation of the CI using a service interruption detecting function. As a result, the SIV also stops. However, because the SIV is an apparatus that supplies the overall power for the vehicle, it is desirable not to stop the SIV as much as possible. To prevent the SIV from stopping, it is necessary to adopt measures for, for example, increasing the capacity of a smoothing filter capacitor (hereinafter simply referred to as "FC") connected to the intermediate DC link circuit.

In the related art disclosed in Patent Document 1 described above, a method of continuing the operation of the SIV by connecting energy accumulating means to the intermediate DC link circuit is adopted. Specifically, the energy accumulating means includes an accumulating element unit including a capacitor that absorbs and accumulates energy in power operation or regenerative operation. The energy accumulating means is configured to be capable of continuing operation using the energy accumulated in the accumulation element unit in a state in which power is insufficient such as pantograph bounce or service interruption.

Patent Document 1: Japanese Patent Application Laid-open No. 2003-199354

DISCLOSURE OF INVENTION

Problem to be Solved by the Invention

However, in the related art disclosed in Patent Document 1, to continue the SIV operation during the loss of overhead power, there is a problem in that an increase in size or additional installation of hardware is necessary, for example, the FC capacity has to be increased or the energy accumulating means has to be added.

The present invention has been devised in view of the above and it is an object of the prevent invention to obtain a control apparatus for an AC electric power vehicle that can continue the operation of the SIV during the loss of overhead power while preventing an increase in size and additional installation of hardware.

MEANS FOR SOLVING PROBLEM

In order to solve the aforementioned problems and attain the aforementioned object, a control apparatus for an AC electric motor vehicle according to one aspect of the present invention is constructed in such a manner as to include: a converter that converts an AC voltage input from an AC overhead wire via a transformer into a DC voltage, an inverter that converts the DC voltage into an AC voltage, and a motor that is driven and controlled by the inverter, the control apparatus include: a torque-command calculating unit that calculates a torque command value of the motor and outputs the torque command value to the inverter; and a static inverter that supplies electric power to a load mounted on the AC electric motor vehicle, wherein when the AC voltage is not applied to the converter, the torque-command calculating unit calculates a regenerative torque command value corresponding to power consumption of the static inverter, based on a rotor frequency of the motor, an input current of the static inverter, and an input voltage of the static inverter, and the inverter supplies, according to the regenerative torque command value, regenerated power generated by the motor to the static inverter.

Effect of the Invention

According to the present invention, a control apparatus for an AC electric motor vehicle includes a regenerative-brake-torque-command calculating unit including one of a first arithmetic processing unit that calculates, during a loss of overhead power due to pantograph bounce or the like, based on an SIV input current, a DC voltage, and a rotor frequency, a first regenerative torque command value for compensating for power consumption of an SIV and a second arithmetic processing unit that calculates, based on a DC voltage and a DC voltage command, a second regenerative torque command value at which the DC voltage becomes constant. Therefore, there is an effect that it is possible to continue the operation of the SIV during the loss of overhead power while preventing an increase in size and additional installation of hardware.

EXPLANATIONS OF LETTERS OR NUMERALS

Figure 1:
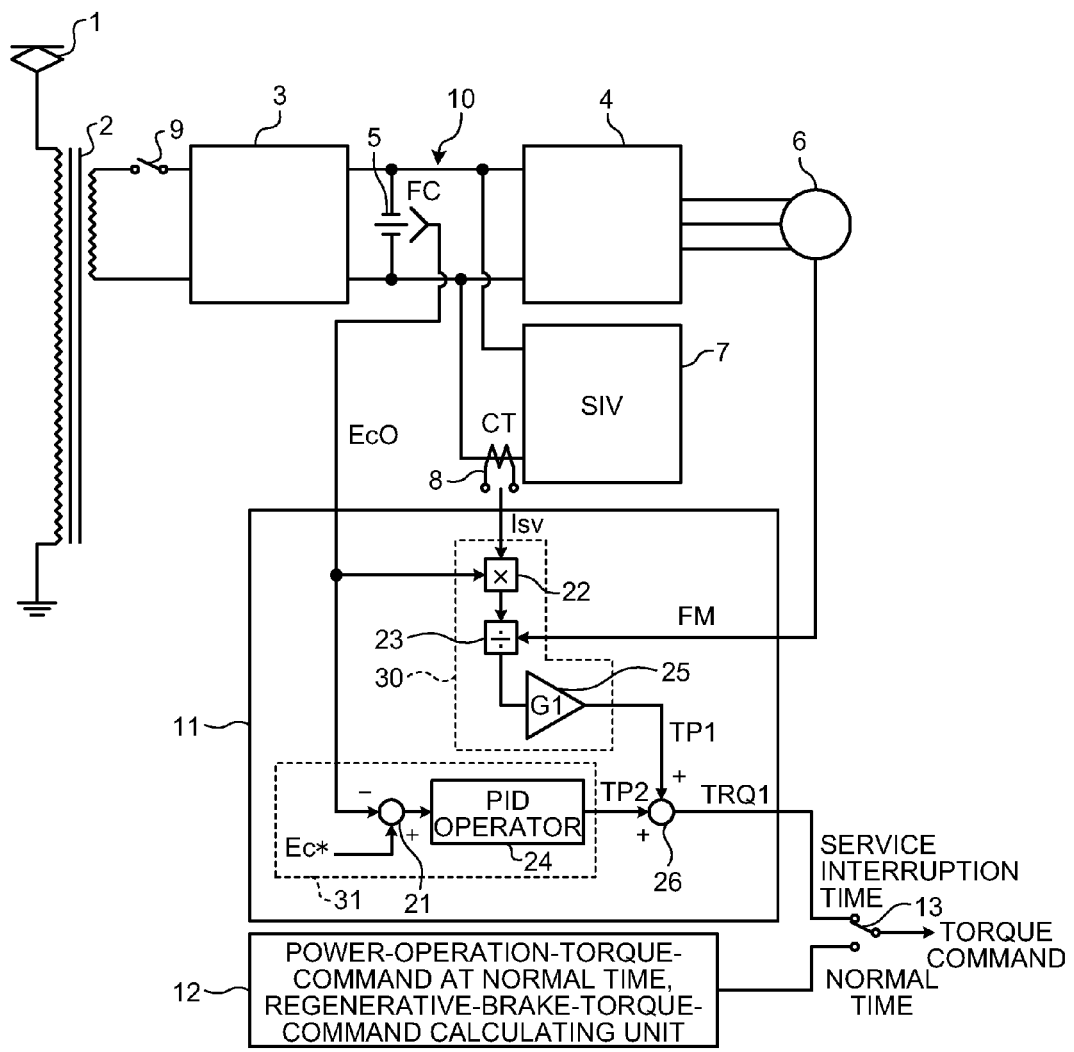
FIG. 1 is a functional block diagram in which the configuration of a regenerative-brake-torque-command calculating unit according to a first embodiment is mainly shown.

1 Pantograph
2 Main transformer
3 Converter
4 Inverter
5 Filter capacitor
6 Main motor
7 Static inverter
8 Current sensor
9 Contactor
10 Intermediate DC link circuit
11 Regenerative-brake-torque-command calculating unit 12 Power-operation-torque-command/regenerative-brake-torque-command calculating unit
13 Switch
21 Subtracter
22 Multiplier
23 Divider
24 PID operator
25 Gain adder
26 Adder
30 First arithmetic processing unit
31 Second arithmetic processing unit
Ec* DC voltage command (DC voltage reference)
Ec0 DC voltage
FM Rotor frequency (frequency of a motor)
Isv SIV input current
TP1 First regenerative torque command value
TP2 Second regenerative torque command value
TRQ1, TRQ2 Regenerative torque command value

BEST MODE(S) FOR CARRYING OUT THE INVENTION

Embodiments of a control apparatus for an AC electric motor vehicle according to the present invention are explained in detail below with reference to the drawings. The present invention is not limited by the embodiments.
First Embodiment
Configuration of a Control Apparatus for an AC Electric Motor Vehicle
FIG. 1 is a functional block diagram in which the configuration of a regenerative-brake-torque-command calculating unit according to a first embodiment is mainly shown. A driving system of an AC electric motor vehicle is shown in the upper part of the figure. A regenerative-brake-torque-command calculating unit 11 (hereinafter simply referred to as "calculating unit 11") and a power-operation-torque-command/regenerative-brake-torque-command calculating unit 12 (hereinafter simply referred to as "calculating unit 12") forming a control system for regenerative torque are shown in the lower part of the figure.

The driving system of the AC electric motor vehicle includes, as main components, a pantograph 1 to which AC power from an AC overhead wire is input, a main transformer 2 that receives, as an input, the AC power supplied from the pantograph 1, a converter 3 to which an AC voltage of the main transformer 2 is applied and converts the AC voltage into a DC voltage, an inverter 4 that converts the DC voltage output from the converter 3 into a three-phase alternating current, an FC 5 that is provided on a DC output side of the inverter 4 and smoothes the DC voltage of the converter 3, a main motor 6 that is driven by the AC voltage of the inverter 4, a static inverter (hereinafter simply referred to as "SIV") 7 connected to an intermediate DC link circuit 10, a current sensor (hereinafter simply referred to as "CT") 8 that is provided on an input side of the SIV 7 and obtains a load current, and a contactor 9 as an opening and closing unit that disconnects the main transformer 2 and the converter 3.

One end on a primary side of the transformer 2 is connected to the AC overhead wire via the pantograph 1 and the other end is connected to a rail having ground potential via now-shown wheels. In other words, the transformer 2 is configured to receive, via the AC overhead wire, the pantograph 1, the wheels, and the rail, electric power transmitted from a not-shown electric power substation. A control apparatus for the AC electric motor vehicle performs the power conversion explained above and drives the main motor 6 during power operation of the electric motor vehicle. However, during braking, the control apparatus causes the main motor 6 to act as a generator. The inverter 4 operates in an electric brake mode and causes a regenerative brake to act.

(Regenerative-brake-torque-command calculating unit)

The calculating unit 11 includes, as main components, a first arithmetic processing unit 30, a second arithmetic processing unit 31, and an adder 26. Further, the first arithmetic processing unit 30 includes a multiplier 22, a divider 23, and a gain adder 25. The second arithmetic processing unit 31 includes a subtracter 21 and a PID operator 24. The calculating unit 11 configured in this way calculates a regenerative torque command value TRQ1 for causing the SIV 7 to continue to operate during a loss of overhead power. The calculating unit 12 calculates a power operation torque command value or a regenerative torque command value at normal time. A switch 13 switches outputs of the calculating unit 11 and the calculating unit 12.

The operation of the control apparatus for the AC electric motor vehicle during the loss of overhead power is explained below. When overhead power is lost because of a factor such as pantograph bounce or section passage, the loss of the overhead power is detected by a not-shown service interruption detector, the converter 3 stops operation, and the contactor 9 is opened. On the other hand, the inverter 4 continues operation in the electric brake mode, the switch 13 switches an output of the control apparatus from an output at normal time to an output at service interruption time, and the regenerative torque command value TRQ1 for controlling the inverter 4 calculated by the calculating unit 11 is output.

The operations of the first arithmetic processing unit 30 and the second arithmetic processing unit 31 are explained in detail below. In the first arithmetic processing unit 30, the multiplier 22 multiplies together an SIV input current Isv, which is obtained from the CT 8 and is to be input to the SIV 7, and a DC voltage Ec0 detected from the FC 5 and calculates power to be consumed by the SIV 7.

The divider 23 divides power consumption of the SIV 7 by a rotor frequency FM (equivalent to vehicle speed) of the main motor 6 to output an output torque equivalent amount. The gain adder 25 adds a gain G1 to the output torque equivalent amount. As a result, a first regenerative torque command value TP1 for compensating for the power consumption of the SIV 7 is output to the adder 26. A place for detecting the DC voltage Ec0 only has to be the intermediate DC link circuit 10 and is not limited to the FC 5.

In the second arithmetic processing unit 31, the subtracter 21 calculates a deviation between a predetermined DC voltage command Ec*, which is a DC voltage reference, and the DC voltage Ec0. The PID operator 24 obtains, based on the deviation, a second regenerative torque command value TP2 at which a value of the DC voltage Ec0 applied to the SIV 7 is kept constant. The PID operator 24 is used as an example. However, an operator is not limited to this and may be a PD operator or the like. The first regenerative torque command value TP1 and the second regenerative torque command value TP2 are added up by the adder 26 to obtain the regenerative torque command value TRQ1, which is a torque command value for continuous operation of the SIV 7.

In this way, in the control apparatus for the AC electric motor vehicle according to this embodiment, when an AC voltage is not applied to the converter 3, the calculating unit 11 calculates the regenerative torque command value TRQ1 corresponding to the power consumption of the SIV 7, the regenerative torque command value TRQ1 is output to the inverter 4, and the inverter 4 supplies, according to the regenerative torque command value TRQ1, regenerated power generated by the motor 6 to the intermediate DC link circuit 10. Therefore, the SIV 7 can continue operation even if the overhead power is lost.

As explained above, the control apparatus for the AC electric motor vehicle according to this embodiment includes the calculating unit 11 including the first arithmetic processing unit 30 that calculates, during a loss of overhead power due to pantograph bounce or the like, based on the SIV input current Isv, the DC voltage Ec0, and the rotor frequency FM of the motor 6, the regenerative torque command value TRQ1 for compensating for the power consumption of the SIV 7 and the second arithmetic processing unit 31 that calculates, based on the DC voltage Ec0 and the DC voltage command Ec*, the regenerative torque command value TRQ2 at which the DC voltage Ec0 becomes constant. Therefore, because regenerated electric energy meeting the power consumption of the SIV 7 is supplied to the intermediate DC link circuit 10 according to the control by the inverter 4 without increasing the capacity of the FC 5 or adding special hardware (not shown) such as energy accumulating means, it is possible to finely control the SIV 7 and cause the SIV 7 to continue to operate. Because it is possible to cause, effectively using regenerated power, the SIV 7 to continue to operate, it is possible to reduce energy supply from the overhead wire and reduce energy consumption compared with those in the related art.

Second Embodiment

A control apparatus for an AC electric motor vehicle according to a second embodiment is configured to be capable of obtaining effects same as those in the first embodiment even if one of the first arithmetic processing unit 30 and the second arithmetic processing unit 31 is omitted from the calculating unit 11 according to the first embodiment. The configuration and the operation of the control apparatus for the AC electric motor vehicle according to this embodiment are explained below. Components same as those in the first embodiment are denoted by the same reference numerals and signs and detailed explanation of the components is omitted.

Figure 2:
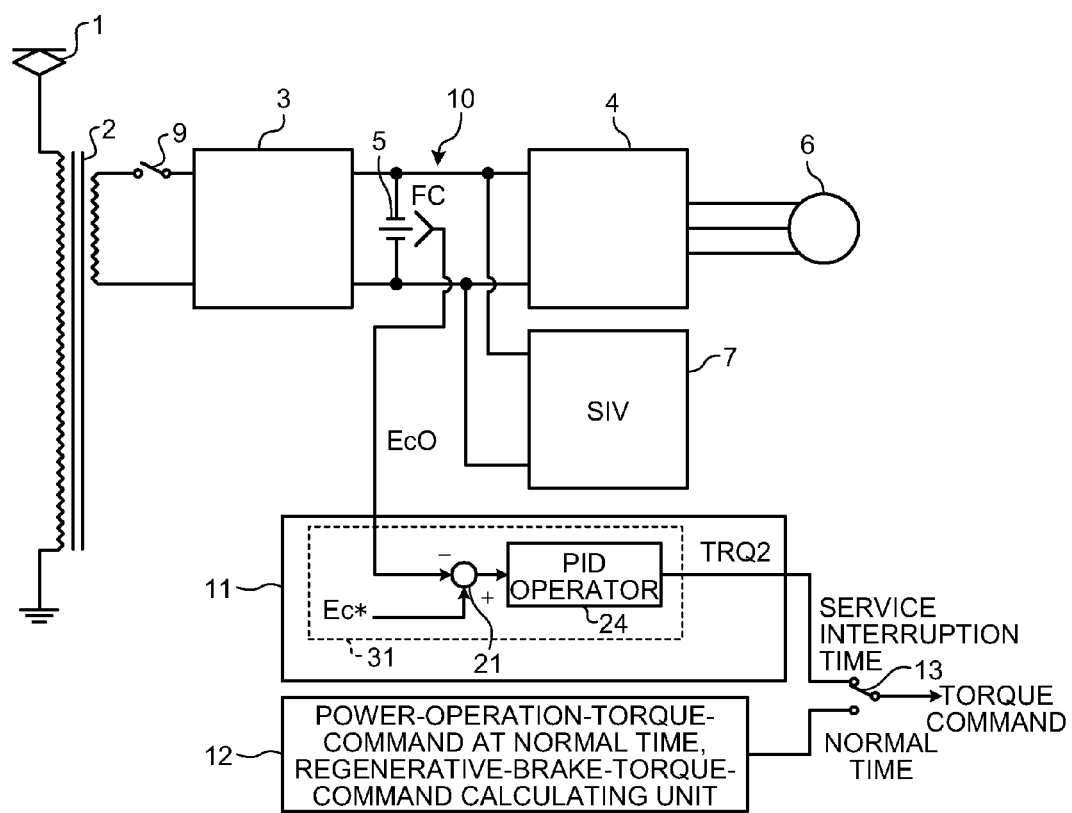
FIG. 2 is a functional block diagram in which the configuration of a regenerative-brake-torque-command calculating unit according to a second embodiment is mainly shown.

FIG. 2 is a functional block diagram in which the configuration of a regenerative-brake-torque-command calculating unit according to the second embodiment is mainly shown. In FIG. 2, as explained above, the first arithmetic processing unit 30 and the adder 26 shown in FIG. 1 are omitted. For example, when the SIV 7 consumes electric power, the DC voltage Ec0 falls in a non-operation state of the converter 3. Therefore, if regenerated energy of the inverter 4 is increased according to the fall of the DC voltage Ec0, functions equivalent to those in the first embodiment are obtained.

Specific operations of the control apparatus for the AC electric motor vehicle during a loss of overhead power are explained below. When a loss of overhead power occurs because of a factor such as pantograph bounce or section passage, the loss of overhead power is detected by the not-shown service interruption detector, the converter 3 stops operation, and the contactor 9 is opened. On the other hand, the inverter 4 continues to operate in an electric brake mode and the switch 13 switches an output of the control apparatus from an output at normal time to an output at service interruption time. In the second arithmetic processing unit 31, as in the first embodiment, the subtracter 21 calculates a deviation between the DC voltage command Ec* and the DC voltage Ec0 and the PID operator 24 obtains, based on the deviation, the regenerative torque command value TRQ2.

The configuration of the control apparatus for the AC electric motor vehicle according to this embodiment is not limited to the configuration in which the first arithmetic processing unit 30 and the adder 26 are omitted. The control apparatus can include the first arithmetic processing unit 30 instead of the second arithmetic processing unit 31. When the converter 3 stops operation during a loss of overhead power, the SIV 7 mainly consumes power. Therefore, it is obvious that, even if the second arithmetic processing unit 31 is removed, equivalent functions can be obtained by the first arithmetic processing unit 30.

As explained above, because the control apparatus for the AC electric motor vehicle according to this embodiment is configured to include one of the first arithmetic processing unit 30 and the second arithmetic processing unit 31, it is possible to cause the SIV 7 to continue to operate as in the first embodiment during a loss of overhead power due to pantograph bounce or the like. It is possible to simplify the configuration of the control apparatus because the CT 8 can be omitted. When the control apparatus includes only the first arithmetic processing unit 30, it is possible to realize further simplification of the control apparatus and appropriate power supply to the SIV 7. When the control apparatus includes only the second arithmetic processing unit 31, the regenerative torque command TRQ2 can be generated according to only voltage information. Therefore, it is possible to realize further simplification of the control apparatus and quick power supply to the SIV 7.

The control apparatuses for the AC electric motor vehicle explained in the first and second embodiments indicate examples of contents of the present invention. It goes without saying that the control apparatuses can also be combined with still another publicly-known technology or can also be configured by changing the control apparatuses, for example, omitting a part of the control apparatuses without departing from the spirit of the present invention.

Industrial Applicability

As explained above, the present invention is applicable to a control apparatus for an AC electric motor vehicle and, in particular, is useful as an invention for causing, with a simple configuration, a static inverter, which supplies electric power to a vehicle even during a loss of overhead power, to continuously operate.

The invention claimed is:

1. A control apparatus for an AC electric motor vehicle including a converter that converts an AC voltage input from an AC overhead wire via a transformer into a DC voltage, an inverter that converts the DC voltage into an AC voltage, and a motor that is driven and controlled by the inverter, the control apparatus comprising:
   a torque-command calculating unit that calculates a torque command value of the motor and outputs the torque command value to the inverter; and
   a static inverter that supplies electric power to a load mounted on the AC electric motor vehicle, wherein
   when the AC voltage is not applied to the converter, the torque-command calculating unit calculates a regenerative torque command value corresponding to power consumption of the static inverter, based on a rotor frequency of the motor, an input current of the static inverter, and an input voltage of the static inverter, and the inverter supplies, according to the regenerative torque command value, regenerated power generated by the motor to the static inverter.

2. The control apparatus for the AC electric motor vehicle according to claim 1, wherein
   the torque-command calculating unit calculates a regenerative torque command value at which the power consumption of the static inverter is compensated, and the inverter supplies the regenerated power to the static inverter according to the regenerative torque command value.

3. The control apparatus for the AC electric motor vehicle according to claim 2, wherein the torque-command calculating unit calculates a first regenerative torque command value at which the power consumption of the static inverter is compensated and a second regenerative torque command value at which a value of a DC voltage applied to the static inverter is kept constant, and the inverter supplies the regenerated power to the static inverter according to the first regenerative torque command value and the second regenerative torque command value.

* * * * *